United States Patent [19]

Cooper et al.

[11] Patent Number: 4,983,837
[45] Date of Patent: Jan. 8, 1991

[54] FORWARD LOOKING INFRARED IMAGING SYSTEM

[75] Inventors: Erwin E. Cooper, Carrollton; Franklin L. Davis, Dallas; Stephen F. Sagan, Plano, all of Tex.

[73] Assignee: Texas Instruments Incorporated, Dallas, Tex.

[21] Appl. No.: 265,365

[22] Filed: Oct. 31, 1988

[51] Int. Cl.⁵ .................. H01J 31/49; G02B 13/14; H01L 31/04
[52] U.S. Cl. .................. 250/334; 250/342; 250/353; 350/1.3
[58] Field of Search ............ 250/334, 332, 342, 353, 250/338.1; 350/1.3

[56] References Cited

U.S. PATENT DOCUMENTS 4,280,050 7/1981 Callender et al. ............ 250/334
4,427,259 1/1984 Fjeldsted .................. 350/1.3

Primary Examiner—Janice A. Howell
Assistant Examiner—Richard Hanig
Attorney, Agent, or Firm—Ferdinand M. Romano; René E. Grossman; Melvin Sharp

[57] ABSTRACT

Apparatus and methods for modifying existing forward looking infrared systems and for forming new forward looking infrared systems. Generally, the system comprises a Galilean afocal system in combination with a reimaging afocal system. A reimaging afocal lens system is formed with at least first and second lenses and a plane for forming an image therebetween. A thermal reference source is positioned in the imaging plane of the reimaging system. The method for modifying an existing forward looking infrared imaging system includes positioning the reimaging system along the optical path of the system between the Galilean lens combination and the scanning device. According to a method for forming a forward looking infrared system an imaging lens system is arranged along an optical path in combination with a detector array to focus collimated radiation upon the detector array. The detector array subtends the field of view along a first direction. A reimaging afocal system is incorporated along the optical path to provide collimated radiation to the imaging lens system and a scanning device is positioned between the reimaging afocal system and the imaging lens system to vary the field of view along a second direction in order to provide a two dimensional image. A Galilean afocal lens system is positioned to receive radiation from a scene and transmit the radiation to the reimaging afocal system.

39 Claims, 2 Drawing Sheets

FORWARD LOOKING INFRARED IMAGING SYSTEM

FIELD OF THE INVENTION

This invention relates to forward looking infrared imaging systems and, more particularly, to components and methods for forming and modifying such systems.

BACKGROUND

Forward looking infrared (FLIR) imaging systems incorporate photodetector arrays of photosensitive semiconductor materials such as $Hg_{1-x}Cd_xTe$ which can be formulated to respond to wavelengths in the 3-5 and 8-12 micrometer atmospheric windows. Both p-n junction photodiode arrays and MIS photocapacitor arrays of $Hg_{1-x}Cd_xTe$ provide satisfactory focal plane imaging in the infrared regime. These systems produce standard video pictures wherein the thermal temperatures of the viewed scene are displayed as various shades of gray.

Continued efforts to improve the performance of FLIR systems frequently result in new advances for photodetector arrays as well as modifications to image processing circuitry and introduction of additional system components. Field implementation of these improvements often presents design difficulties. This is because FLIR systems are complex and costly electrooptical/mechanical assemblies that must be individually configured to meet the physical constraints of each application. For example, although different systems may be formed of many common modules, the systems may be incompatible because they are arranged for different space geometries or because they each require optical inputs from different directions. In addition, performance requirements, e.g., field of view, magnification and resolution, which affect the overall size of a system, will generally differ.

Implementation of FLIR system improvements may occur when a complete system is designed for a new application, or, as part of an effort to upgrade an older system. When cost effective it is desirable to upgrade or retrofit older systems rather than to replace them. However, the redesign necessary to incorporate an improvement into an older system may require substitution of more costly components which are, at most, only indirectly related to the improvement.

In addition to incorporation of more advanced detector arrays, recent improvements in the performance of FLIR systems have required the provision of thermal reference sources as well as circuitry to perform DC restoration and detector electronic gain balance functions. When upgrades to scanning FLIR systems include these improvements it is necessary to modify the optical path so that the detector array can view the thermal source. This can be accomplished by replacing either the imaging optics or the afocal optics with a lens system that includes an additional image plane such that the reference source can be introduced during inactive scan time, i.e., when the scene is not being viewed. In the past each of these approaches has required substantial optical or mechanical modification to the system.

Most FLIR systems do not include reimaging imagers and additional space would be required to replace an imager with a reimaging imager. Furthermore, a thermal reference source cannot simply be positioned in the intermediate image plane of a reimaging imager. This is because FLIR detectors are not designed to scan such image planes. Thus, in order to view the thermal source apart from the radiation which forms an image of the scene, it is necessary to introduce an optical/mechanical chopper wheel within the optical path. For example, in order to periodically provide an image of the thermal source to the detector array a rotating mirror could be synchronized and phased with the scanner. With this arrangement an image of the thermal source is provided to the detector array during periods when the scanner is not providing image data to the detector array. An additional mirror may be required to complete the optical path, particularly if an existing system is being upgraded to include the thermal reference source. Introduction of the mirrors, as well as an electromechanical system to effect synchronous rotation, can be a difficult and costly task, especially in existing systems, because of severe space constraints and the requirements for moving parts and circuitry for effecting synconous chopping.

Alternately, a reimaging afocal may be introduced in lieu of a Galilean afocal to provide an image plane for the introduction of thermal sources in front of the scanner. By replacing the Galilean afocal with a reimaging afocal lens system the thermal sources can be scanned along with the field of view. However, different FLIR systems often require different fields of view or different afocal levels of magnification. Thus introduction of the thermal reference source would require redesign for each distinct application. Furthermore, reimaging afocals are considerably more expensive and require more space than Galilean afocals.

In summary, known methods for introducing thermal reference sources into FLIR systems are costly and require custom modifications for dissimilar systems. It would be advantageous to provide a means for incorporating thermal reference sources into both new and existing FLIR systems which is simpler and less costly than known techniques.

SUMMARY OF THE INVENTION

There are provided apparatus and methods for modifying existing forward looking infrared systems and for forming new forward looking infrared systems. Generally, the system comprises a Galilean afocal system in combination with a reimaging afocal system. A reimaging afocal lens system is formed with at least first and second lenses and a plane for forming an image therebetween. A thermal reference source is positioned in the imaging plane of the reimaging system. The method for modifying an existing forward looking infrared imaging system includes positioning the reimaging system along the optical path of the system between the Galilean lens combination and the scanning device.

According to a method for forming a forward looking infrared system an imaging lens system is arranged along an optical path in combination with a detector array to focus collimated radiation upon the detector array. The detector array subtends the field of view along a first direction. A reimaging afocal system is incorporated along the optical path to provide collimated radiation to the imaging lens system and a scanning device is positioned between the reimaging afocal system and the imaging lens system to vary the field of view along a second direction in order to provide a two dimensional image. A Galilean afocal lens system is positioned to receive radiation from a scene and transmit the radiation to the reimaging afocal system.

BRIEF DESCRIPTION OF THE DRAWING

The invention may best be understood by reference to the following detailed description when read in conjunction with the Drawing wherein.

Certain preferred embodiments of the invention are disclosed herein. However, it should be appreciated that the specific optical arrangements are merely illustrative and do not delimit the scope of the claims.

DESCRIPTION OF THE PREFERRED EMBODIMENTS

Heretofore, parallel scan FLIR systems which incorporate thermal reference sources have not been produced in large numbers. In those instances when reimaging afocal lens systems have been used to incorporate the thermal reference sources, the afocal systems have been individually designed to provide the resolution and field of view required by the particular system. The present invention provides a simpler and more cost effective method for incorporating thermal reference sources into FLIR systems. The FLIR system arrangement disclosed herein makes possible the upgrade of existing FLIR systems as well as the production of new systems with greater economies of scale.

Figure 1:
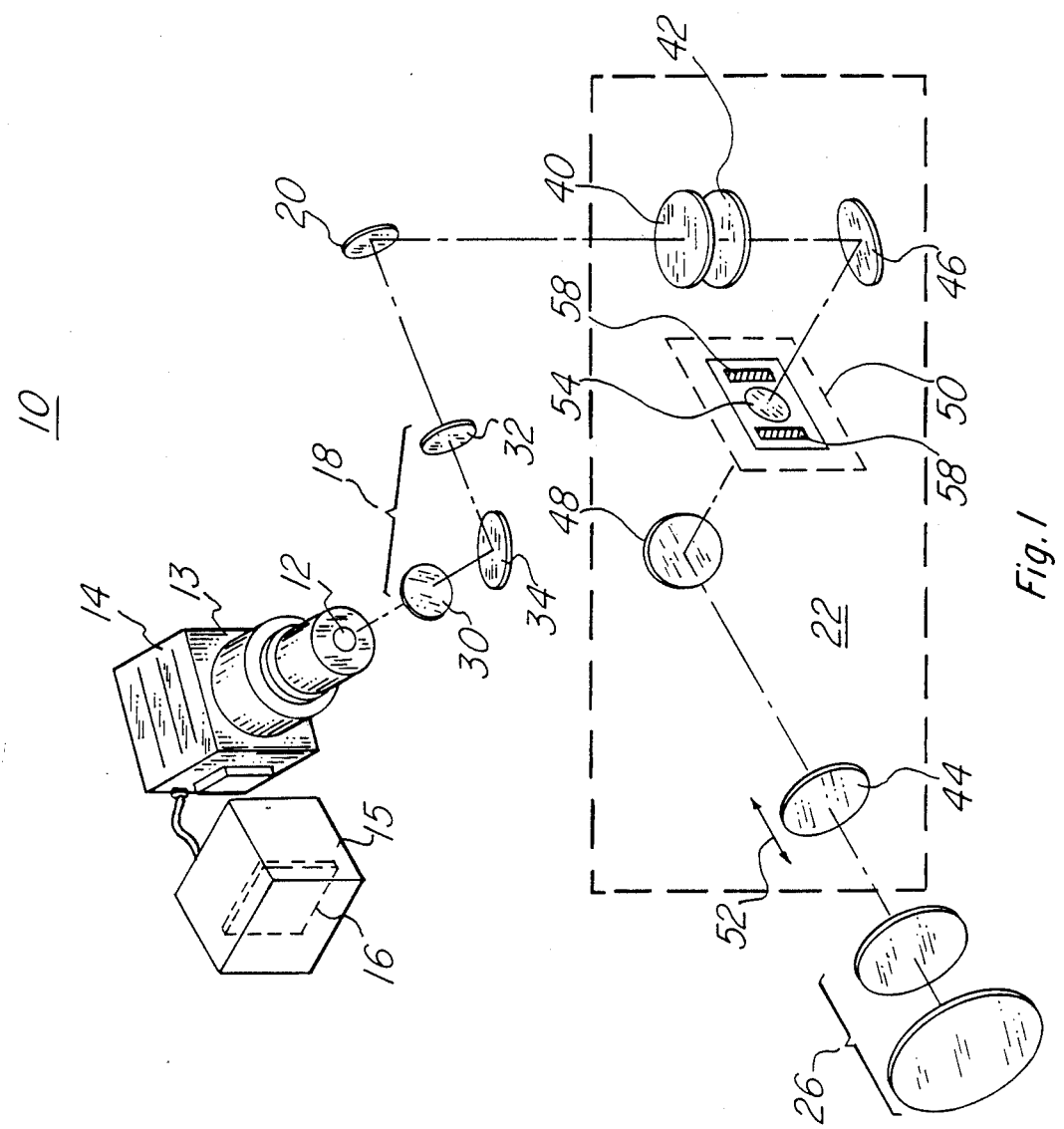
FIG. 1 which illustrates in partial schematic form an exemplary FLIR imaging system according to the invention.

FIG. 1 illustrates in partial schematic form an exemplary parallel scan forward looking infrared imaging system 10 constructed according to the invention. The system includes a $Hg_{1-x}Cd_xTe$ linear array infrared detector 12 contained in a dewar 13 and coupled to a cryogenic cooler 14. The detector comprises a vertical array of elements which are photosensitive to radiation in either or both the 3–5 and 8–12 micrometer range. By way of example, the detector 12 may comprise a column of 240 or 480 elements, or may include multiple parallel columns of elements. The detector 12 is coupled to processing electronics 15 which, in the preferred embodiments, includes circuitry 16 for performing DC restoration and/or detector electronic gain balance functions.

The detector array subtends the field of view in a first, e.g., vertical, direction. Incoming radiation is scanned with mirror optics along a second direction and reflected upon the array to provide information for generating a two dimensional image. Limitations in system resolution due to separation distances between detector elements may require interlacing between successive fields to complete a frame.

The cooler may be of the split cycle variety with the expander portion of the cooler in the dewar. The compressor portion of the cooler (not illustrated) is located in a convenient position near the dewar and is connected to the expander portion by a tube. Electronics utilized with the complete system is not integral to the invention and is therefore not described with detail.

The detector 12 receives radiation from a scene along an optical path which includes an imager 18, a mirror scanner 20, a reimaging afocal lens system 22 and a Galilean afocal lens system 26. The detector 12 in combination with the imager 18 and the scanner 20 form the optical sensor portion of the system 10.

The imager 18, positioned to focus collimated radiation upon the detector 12, comprises at least a pair of lenses 30 and 32 and may include a fold mirror 34 positioned in between the lenses to provide a turn in the optical path. The scanner 20 is mechanically driven to subtend the field of view in a direction perpendicular to the direction subtended by the detector array. A position sensor (not illustrated) is coupled to the scanner 20 to provide electrical pulses at various positions of the mirror scanner for displaying the sensor output.

The reimaging afocal lens system 22 is positioned in front of the scanner 20 to receive collimated radiation from the Galilean afocal system 26. As a minimum the reimaging system 22 requires two lenses. In the preferred embodiment it comprises three lenses 40, 42 and 44, forming a color correcting combination, and two fold mirrors 46 and 48 positioned between lenses 40 and 44. An intermediate image plane 50 is formed between the lenses 40 and 44. The region 54 of the image plane 50 corresponds to that portion in which an image of the scene is formed when the system is adjusted to provide a maximum field of view. Preferably the reimaging system includes range and thermal focal adjustments which are indicated schematically by an arrow 52 positioned along side lens 44. Mirror 46 may be used to perform interlace.

In a simple arrangement one or more thermal reference sources, e.g., a pair of sources 58, such as, for example, thermo-electric coolers, may be fixed in the image plane 50. The reference sources 58 are positioned outside the region 54. Only one reference source is required to perform the DC restoration function. A pair of sources is required for gain normalization.

Figure 2:
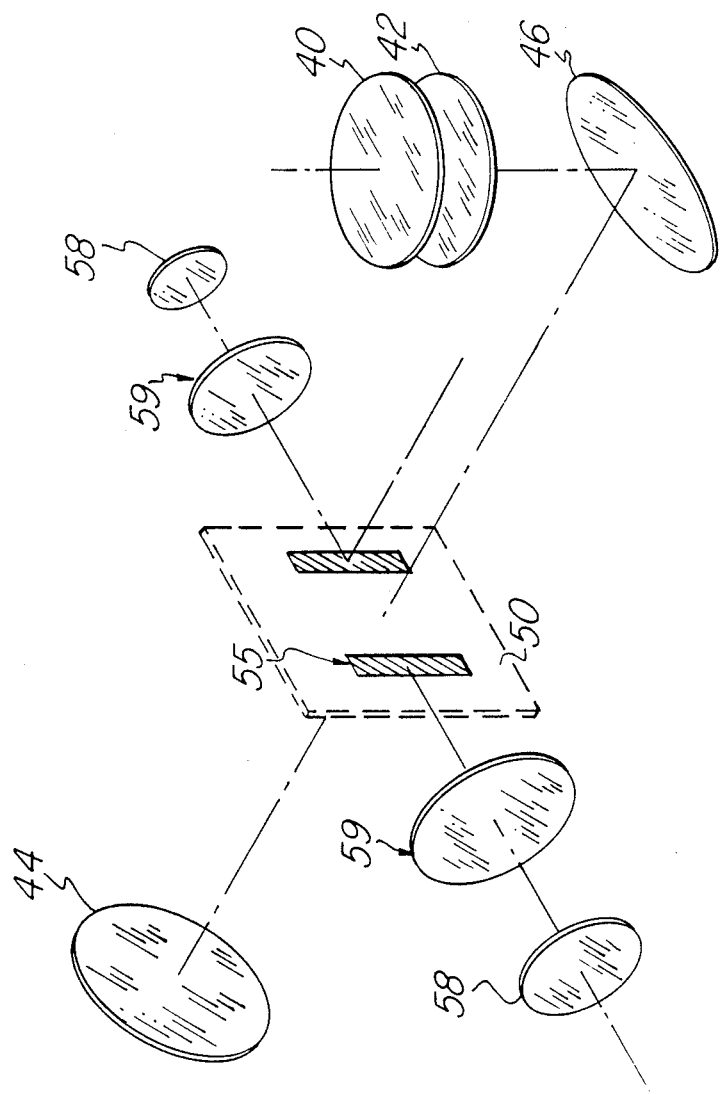
FIG. 2 illustrates an optical arrangement for removing thermal reference source nonuniformities which would otherwise be viewed by individual detector elements.

More preferably, each thermal source 58 is positioned out of focus so as to remove nonuniformities and provide the same temperature reading to each detector element. This can be effected by positioning a pair of mirrors 55 in the image plane 50 as illustrated in FIG. 2. Pairs, each comprising a focusing lens 59 and a reference source 58, are cooperatively positioned to condense radiation from a reference source onto each mirror 55. Each reference source is located at a pupil or aperture plane so as not to be focused on the mirror 55. This arrangement removes nonuniformities which would otherwise be viewed by individual detector elements.

Prior art FLIR systems are not known to include a reimaging afocal lens system 22 in combination with a Galilean afocal system. A function of the reimaging system 22 is to facilitate the use of existing Galilean afocals in FLIR systems which are upgraded to include DC restoration or detector electronic gain balance circuitry which circuitry requires inclusion of a thermal reference source. Otherwise modifications in system resolution and field of view would have to be performed by the reimaging afocal at much greater expense.

In preferred embodiments of the invention the reimaging system 22 is of a standard size and optical design such that it may be incorporated in a wide variety of existing, e.g., common module, and new systems which also comprise a Galilean afocal system—not-withstanding differing geometric and physical constraints as well as differences in optical performance parameters among the variety of systems. Formulation of a standard reimaging system allows for more economical upgrading and fabrication of FLIR systems. For example, a benefit of using a standard size reimaging afocal is that existing systems can be updated without discarding Galilean afocals and their gimbal pointing and stabilization turrets. One of the most expensive components of the FLIR system, the afocal lens switching assembly, could thus be retained.

According to the invention, in both new and existing systems, modifications in system resolution and field of view are primarily performed by the Galilean afocal lens system 26. Obtaining similar performance features without the Galilean system would be considerably less desirable because the reimaging afocal would then have to be greater in length and contain more optical elements. In addition to being more costly, this alternative arrangement would also be more difficult to package. Furthermore, if resolution and field of view were to be provided by the reimaging afocal, the thermal reference sources 58 would have to be reconfigured for each system application or field of view.

There has been illustrated a FLIR imaging system comprising a Galilean afocal lens system in combination with a reimaging afocal lens system. The combination provides an economical method for modifying existing FLIR systems and for designing new FLIR systems to include thermal reference sources. More specifically, the invention includes a method for replacing a component of the optical sensor, e.g., the detector 12, or an electronic component in an existing first FLIR system with a component which requires a thermal reference source; and for forming a second FLIR system with an optical sensor component or an electronic component which requires a thermal reference source wherein each system includes a Galilean afocal lens combination. The electronic component may, for example, include circuitry for performing DC restoration and/or detector electronic gain balance functions. This method comprises the steps of:

forming two or more reimaging afocal lens systems each comprising at least first and second lenses and a plane for forming an image therebetween;
 positioning a thermal reference source in each reimaging system;
 replacing an optical sensor component or an electronic component in the existing first system with a component of desired design;
 positioning a reimaging afocal system along the optical path of the existing first system between the Galilean lens combination and the sensor portion;
 forming the second system in part by arranging along an optical path a Galilean afocal lens system followed by an imaging lens system in combination with an optical detector to focus collimated radiation upon the detector; and
 incorporating a reimaging afocal system along the optical path of the second system between the Galilean afocal lens system and the imaging lens system.

Certain preferred embodiments of the invention have been described. Various other arrangements and configurations of the disclosed embodiments and various alternative components thereof will be apparent. For example, the sensor portion may be of the type which does not require cooling and the lens systems illustrated may be modified to include reflective lenses instead of refractive lenses. Accordingly, the scope of the invention is only to be limited by the claims which follow.

We claim:

1. A method for modifying an existing forward looking infrared imaging system wherein the system is of the type which processes radiation received from a scene to form an image thereof, wherein the system includes a first Galilean afocal lens combination and wherein sensor components include a detector element array of the type which subtends the field of view along a first direction and a scanning device for varying the field of view along a second direction in order to provide a two dimensional image, the method comprising the steps of:
 forming a first reimaging afocal lens system comprising at least first and second lenses and a plane for forming an image therebetween;
 positioning a thermal reference source in the reimaging system; and
 positioning the reimaging system along the optical path of the existing first system between the Galilean lens combination and the scanning device.

2. The method of claim 1 further including the step of replacing the detector array of the existing system with a different detector array.

3. The method of claim 1 further including the step of incorporating into the existing system circuitry for performing detector electronic gain balance functions.

4. The method of claim 1 further including the step of incorporating into the existing system circuitry for performing DC restoration.

5. The method of claim 1 comprising additional steps to modify a second existing forward looking infrared imaging system wherein the second system includes a second Galilean afocal lens combination which is different in size or optical design from the first Galilean afocal lens combination, said additional steps including:
 forming a second reimaging afocal lens system comprising at least first and second lenses and a plane for forming an image therebetween;
 positioning a thermal reference source in the second reimaging system; and
 positioning the reimaging system along the optical path of the existing second system between the second Galilean lens combination and the scanning device.

6. The method of claim 5 wherein the first and second reimaging afocal lens systems are identical in size and optical design.

7. The method of claim 5 wherein each reimaging afocal lens system is formed by combining at least one fold mirror with the first and second lenses to direct the optical path onto the scanning device.

8. The method of claim 1 wherein two thermal reference sources are positioned in the reimaging afocal lens system, so as to reduce thermal nonuniformities and provide more uniform temperature readings to each detector element said method further including the steps of:
 positioning a pair of mirrors in the image plane of the reimaging afocal system;
 cooperatively positioning a first focusing lens and one reference source to condense radiation from the reference source onto a first mirror; and
 cooperatively positioning a second focusing lens and the second reference source to condense radiation from the reference source onto a second mirror.

9. A method for forming a forward looking infrared imaging system wherein the system is of the type which processes radiation received from a scene to form an image thereof, wherein sensor components of said desired design include a detector element array of the type which subtends the field of view along a first direction and a scanning device for varying the field of view along a second direction in order to provide a two dimensional image, the method comprising the steps of:

forming a first reimaging afocal lens system comprising at least first and second lenses and a plane for forming an image therebetween;

positioning a thermal reference source in the reimaging system;

arranging along an optical path an imaging lens system in combination with a detector array to focus collimated radiation upon the detector array, the detector array subtending the field of view along a first direction;

incorporating the reimaging afocal system along the optical path to provide collimated radiation to the imaging lens system;

positioning a scanning device between the reimaging afocal system and the imaging lens system to vary the field of view along a second direction in order to provide a two dimensional image; and positioning a Galilean afocal lens system to receive radiation from a scene and transmit radiation to the reimaging afocal system.

10. The method of claim 9 further including the step of incorporating into the forward looking infrared system circuitry for performing detector electronic gain balance functions.

11. The method of claim 9 further including the step of incorporating into the forward looking infrared system circuitry for performing DC restoration.

12. The method of claim 9 comprising additional steps to form a second forward looking infrared imaging system wherein the second system includes a second Galilean afocal lens system which is different in size or optical design from the first Galilean afocal lens system, said additional steps including:

forming a second reimaging afocal lens system comprising at least first and second lenses and a plane for forming an image therebetween;

positioning a thermal reference source in the second reimaging system;

arranging along a second optical path an imaging lens system in combination with a detector array to focus collimated radiation upon the detector array, the detector array subtending the field of view along a first direction;

incorporating the second reimaging afocal system along the second optical path to provide collimated radiation to the imaging lens system;

positioning a scanning device between the second reimaging afocal system and the imaging lens system to vary the field of view along a second direction in order to provide a two dimensional image; and positioning the second Galilean afocal lens system to receive radiation from a scene and transmit radiation to the reimaging afocal system.

13. The method of claim 12 wherein the first and second reimaging afocal lens systems are identical in size and optical design.

14. The method of claim 12 wherein each reimaging afocal lens system is formed by combining at least one fold mirror with the first and second lenses to direct the optical path onto the scanning device.

15. The method of claim 9 wherein two thermal reference sources are positioned in the reimaging afocal lens system to reduce thermal nonuniformities and provide more uniform temperature readings to each detector element said method further including the steps of:

positioning a pair of mirrors in the image plane of the reimaging afocal system;

cooperatively positioning a first focusing lens and one reference source to condense radiation from the reference source onto a first mirror; and cooperatively positioning a second focusing lens and the second reference source to condense radiation from the reference source onto a second mirror.

16. A method for replacing a component in an existing first forward looking infrared system with a component which requires a thermal reference source and for forming a second forward looking infrared system with a component which requires a thermal reference source wherein the systems are of the type which process radiation received from a scene to form an image thereof, wherein the existing system comprises a Galilean afocal lens combination and sensor components including a detector array of the type which subtends the field of view along a first direction and a scanning device for varying the field of view along a second direction in order to provide a two dimensional image, the method comprising the steps of:

forming at least first and second reimaging afocal lens systems each comprising at least first and second lenses and a plane for forming an image therebetween;

positioning a thermal reference source in each reimaging system;

replacing an optical or electronic component in the existing first system with a component which requires a thermal reference source;

positioning the first reimaging system along the optical path of the existing first system between the Galilean lens combination and the scanning device;

forming the second forward looking infrared system in part by arranging along an optical path a Galilean afocal lens system followed by an imaging lens system in combination with an optical detector arranged to focus collimated radiation upon the detector; and incorporating the second reimaging system along the optical path of the second forward looking infrared system between the Galilean afocal lens system and the imaging lens system.

17. The method of claim 16 wherein the first and second reimaging afocal systems are of identical size and optical design.

18. The method of claim 17 further comprising the step of replacing the detector array of the existing system with a different detector array.

19. The method of claim 17 further comprising the step of incorporating into the existing system circuitry for performing DC restoration.

20. The method of claim 17 further comprising the step of incorporating into the existing system circuitry for performing detector electronic gain balance functions.

21. The method of claim 17 wherein the first and second reimaging afocal lens systems are formed by combining at least a third lens with the first and second lenses.

22. The method of claim 17 wherein each reimaging afocal lens system is formed by combining at least one fold mirror with the first and second lenses to direct the optical path onto the scanning device.

23. The method of claim 17 further comprising the step of replacing components in each of a plurality of additional existing forward looking infrared systems with components which require thermal reference sources, each additional system also including a Galilean afocal lens combination and a scanning device, said step including:

positioning a reimaging system along the optical path of the each additional existing system between the Galilean lens combination and the scanning device.

24. The method of claim 17 further comprising the step of forming a plurality of additional forward looking infrared systems, each additional system formed by:

arranging along an optical path a Galilean afocal lens system followed by an imaging lens system in combination with an optical detector arranged to focus collimated radiation upon the optical detector; and incorporating a reimaging system along the optical path to provide collimated radiation to the imaging lens system.

25. The method of claim 24 further including the step of positioning a thermal reference source in each additional reimaging system.

26. The method of claim 24 further comprising the step of replacing components in each of a plurality of additional existing forward looking infrared systems with components which require thermal reference sources, each additional system also including a Galilean afocal lens combination and a scanning device, said step including:

positioning a reimaging system along the optical path of the each additional system between the Galilean lens combination and the scanning device.

27. The method of claim 26 further including the step of positioning a thermal reference source in each additional reimaging system.

28. A forward looking infrared system for processing radiation received from a scene to form an image thereof comprising:

an infrared detector element array of the type which subtends the field of view along a first direction;

an imaging lens system for focusing collimated radiation upon the detector;

a scanning mirror for varying the field of view along a second direction in order to provide a two dimensional image of the scene;

a Galilean afocal lens system positioned to receive radiation from the scene; and a reimaging afocal lens system positioned between the Galilean afocal lens system and the scanning mirror said reimaging system including at least first and second lenses for forming a reimaging plane therebetween and for providing collimated radiation to the scanning mirror.

29. The forward looking infrared system of claim 28 further including a thermal reference source positioned in the reimaging plane of the reimaging afocal lens system.

30. The forward looking infrared system of claim 28 further including circuitry for performing DC restoration.

31. The forward looking infrared system of claim 28 further including circuitry for performing detector electronic gain balance functions.

32. The forward looking infrared system of claim 28 wherein the reimaging afocal lens system includes at least first and second lenses, a plane for forming an image therebetween and a thermal reference source.

33. The forward looking infrared system of claim 28 wherein the reimaging afocal lens system includes at least first and second lenses and wherein the relative positions of said lenses are adjustable to provide thermal focusing.

34. The forward looking infrared system of claim 28 wherein two thermal reference sources are positioned in the reimaging afocal lens system to reduce thermal nonuniformities and provide more uniform temperature readings to each detector element said system further comprising:

a pair of mirrors in the image plane of the reimaging afocal system;

a first focusing lens positioned to condense radiation from a first reference source onto a first mirror; and a second focusing lens positioned to condense radiation from the second reference source onto a second mirror.

35. The forward looking infrared system of claim 28 wherein the Galilean afocal lens system is adjustable to modify focal length and field of view.

36. A plurality of forward looking infrared systems each designed to process radiation received from a scene and form an image thereof, each system comprising:

an infrared detector array of the type which subtends the field of view along a first direction;

an imaging lens system for focusing collimated radiation upon the detector;

a scanning mirror for varying the field of view along a second direction in order to provide a two dimensional image of the scene;

a Galilean afocal lens system positioned to receive radiation from the scene; and a reimaging afocal lens system positioned between the Galilean afocal lens system and the scanning mirror said reimaging system including at least first and second lenses for forming a reimaging plane therebetween and for providing collimated radiation to the scanning mirror.

37. The plurality of forward looking infrared systems of claim 36 wherein each system includes a reimaging afocal lens system of the same size and power and wherein first and second of the plurality of systems include Galilean afocal lens systems of different size or optical design.

38. The plurality of forward looking infrared systems of claim 37 wherein the Galilean afocal lens system of the first and second forward looking infrared systems provide different fields of view.

39. The plurality of forward looking infrared systems of claim 36 wherein the Galilean afocal lens systems are adjustable to modify focal length, system resolution and field of view.

* * * * *